Figure 1:
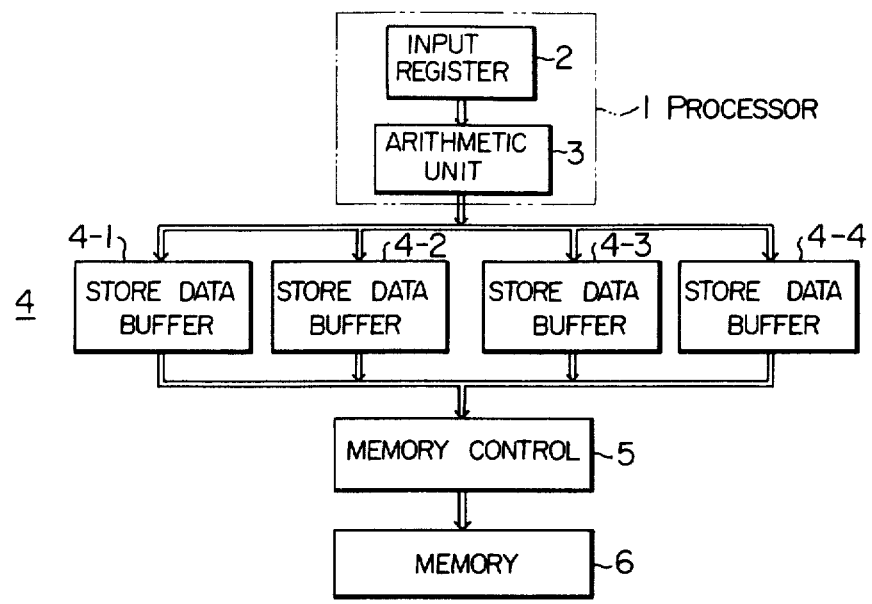

United States Patent [19]

Yamada et al.

[11] 4,318,172

[45] Mar. 2, 1982

[54] STORE DATA BUFFER CONTROL SYSTEM

[75] Inventors: Naoki Yamada, Hadano; Kenichi Wada, Zama, both of Japan

[73] Assignee: Hitachi, Ltd., Tokyo, Japan

[21] Appl. No.: 33,449

[22] Filed: Apr. 26, 1979

[30] Foreign Application Priority Data

May 9, 1978 [JP] Japan ................... 53-54727

[51] Int. Cl.³ .............................................. G06F 13/00
[52] U.S. Cl. .................................. 364/200; 371/12; 371/13
[58] Field of Search ... 364/200 MS File, 900 MS File; 371/12, 13, 33

[56] References Cited

U.S. PATENT DOCUMENTS

| | | | |
|---|---|---|---|
| 3,422,401 | 1/1969 | Lucking | 364/200 |
| 3,533,082 | 10/1970 | Schnabel et al. | 364/200 |
| 3,564,506 | 2/1971 | Bee et al. | 364/200 |
| 3,764,986 | 10/1973 | Spademan et al. | 364/200 |
| 4,034,347 | 7/1977 | Probert, Jr. | 364/200 |
| 4,112,562 | 9/1978 | Scheuneman | 364/900 |

*Primary Examiner*—Gareth D. Shaw
*Assistant Examiner*—David Y. Eng
*Attorney, Agent, or Firm*—Craig and Antonelli

[57] ABSTRACT

A data processing system using a store data buffer control device includes plural store data buffers and the data from a processor is temporarily stored in the store data buffers and then transferred to a memory. A shift register is used to trace the storing requests from the processor so that the storing requests re-executable in the instruction re-execution taking place at the time of a fault occurring are distinguished from the storing requests not re-executable in the same operation. The data held in the store data buffers corresponding to the re-executable requests is invalidated while the data held in the store data buffers corresponding to the non-re-executable requests is kept valid.

7 Claims, 3 Drawing Figures

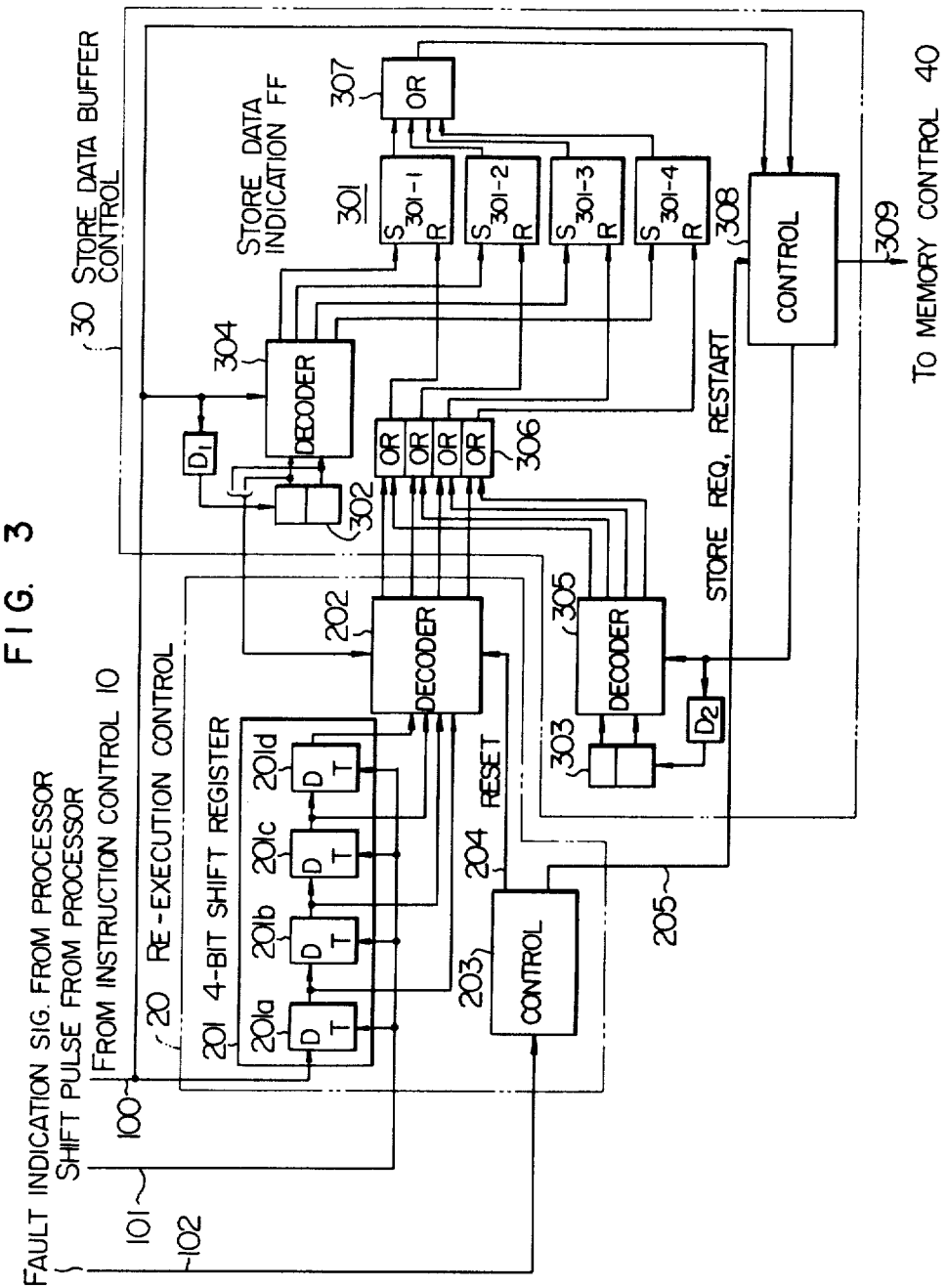

STORE DATA BUFFER CONTROL SYSTEM

This invention relates to a data processing system and more particularly to control of the re-execution of instructions in an information processor using a store data buffer control system.

In general, a data processing system employs certain control systems such as an instruction destination control system (pipelined control system), a buffer memory control system etc. to improve its performance. As one of such control systems there is known a store data buffer control system. With a data processing system employing a store data buffer control, the store data from the processor is temporarily stored in a store data buffer and the data temporarily stored in the store data buffer is then transferred to a memory and stored therein.

An information processor using such a store data buffer control system has the following drawback. As is well known, most of the faults generated in a processor are intermittent and therefore recoverable if the instruction in question is re-executed. It is therefore customary that an instruction processor incorporates therein some means for re-executing instructions. In the re-execution of instructions, an instruction involving a storing operation has its request for storing nullified. And since an instruction for re-execution consists of a limited number of steps, it often happens that in the information processor using a store data buffer control system, the store data which cannot be executed in the instruction re-execution remains left in the store data buffer. If the store data is prevented from being left in the store data buffer, the fault data is directly taken in by the memory so that the following data processing becomes erroneous.

It is therefore the object of this invention to provide an information processor using a store data buffer control system, which can perform correct processing after the generation of a fault.

According to this invention, which has been made to eliminate such a drawback as described above, the information processor using a store data buffer control system causes its re-execution control to trace storing requests and if a fault occurs, the storing requests not executable in the instruction re-execution operation are discriminated from those executable in the same operation, and the contents of the store data buffers corresponding to the re-executable storing requests are nullified while the non-executable storing requests are kept valid thereafter.

Figure 2:
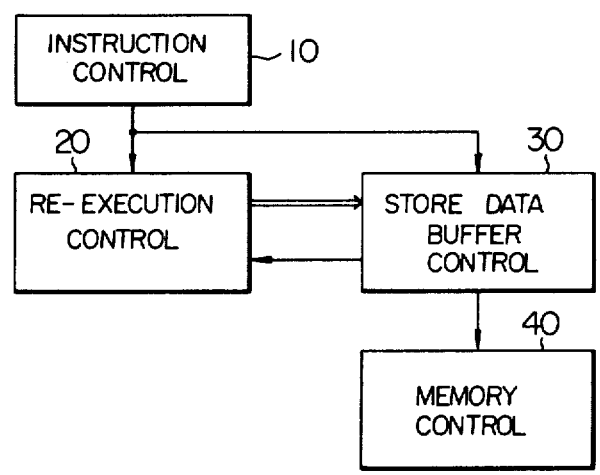

This invention will now be described by way of embodiment with the aid of the attached drawings, in which:

FIG. 1 schematically shows in block diagram the flows of data in the conventional information processor using a store data buffer control system;

FIG. 2 schematically shows in block diagram the control system in an information processor according to this invention; and FIG. 3 shwos in block diagram an embodiment of this invention.

For a better understanding of this invention a conventional information processor will be described before the explanation of this invention. In FIG. 1 showing a conventional information processor using a store data buffer control system, four store data buffers 4 are provided to store data. When data involved a storing operation is set in an input register 2 in a processor 1, the data, after having been arithmetically processed in a predetermined manner by an arithmetic unit 3, is temporarily stored in a vacant one of the store data buffers 4-1 to 4-4. A memory control 5, having responded to the storing request, fetches storing data from the store data buffers 4-1 to 4-4 and writes the storing data in a memory 6. At this stage of the operation, the processor 1 has already entered into the next processing operation and if there is storing data in the input register 2, it is stored in one of the store data buffers 4-1 to 4-4 in the same manner as described above.

FIG. 2 schematically shows the control system of an information processor to which this invention is to be applied. As shown in FIG. 2, an instruction control 10 (provided in the processor 1) serves to control the ordinary execution of instructions and to deliver a storing request at the time of the execution of an instruction requesting a storing operation. When a store data buffer control 30 receives a storing request from the instruction control 10, it delivers storing data to a vacant one of the store data buffers. Also, when data is stored in a store data buffer, the store data buffer control 30 independently delivers a storing request to a memory control 40. When the memory control 40 receives the storing request from the store data buffer control 30, the memory control 40 starts a storing operation to read data out of the store data buffer and to write the read data in the memory.

A re-execution control 20, which is generally known as a means having a function of re-executing an instruction at the time of a fault occuring, according to this invention, initiates controls necessary for the re-execution of instructions and the re-execution of only storing operations. Namely, the re-execution control 20 receives the storing requests delivered from the instruction control 10 and traces the storing requests executable at the time of the instruction re-execution. And when a fault occurs, the re-execution control 20 delivers to the store data buffer control 30 a storing request re-starting instruction signal and a storing request nullifying instruction signal for nullifying the content of the store data buffer corresponding to the re-executable storing request. The store data buffer control 30 nullifies the content of the store data buffer specified by the storing request nullifying instruction signal from the re-execution control 20 so as to prepare for the re-execution of the executable instruction. Also, when data is stored in one of the other store data buffers, the store data buffer control 30 delivers a storing request to the memory control 40 so as to start the re-execution of only the storing operation according to the storing request re-starting instruction signal.

FIG. 3 shows exemplary circuits of the re-execution control 20 and the store data buffer control 30 shown in FIG. 2, as embodiments of this invention in which four store data buffers are provided in agreement with the system configuration shown in FIG. 1 and in which the re-execution of instructions is retraceable four cycles in advance. In FIG. 3, the re-execution control 20 comprises a shift register 201, a decoder 202 and a control 203 and the store data buffer control 30 comprises flip-flops 301 for indicating the storing of data, a buffer input pointer 302, a buffer output pointer 303, decoders 304 and 305, a selection circuit 306, an OR gate 307 and a control 308, all these circuit elements being relevant to this invention.

The shift register 201 of the re-execution control 20 is of a four-bit type and serves to take in storing requests delivered from the instruction control 10 and sent through a signal line 100 and to trace those storing requests which are executable in the instruction re-execution. The processor 1 supplies shift pulses to the shift register 201 in timing with successive shift cycles so that only the storing requests delivered in the previous four cycles may be preserved in the register 201. For example, in the (n+3)th cycle, the 4-bit shift register 201 traces the states of storing requests delivered in the last four cycles, i.e. n-th to (n+3)th cycles. The flip-flops 201a–201d of the shift register 201 indicates the states of the (n+3)th to the n-th cycles, respectively. For example, if store requests are generated in the n-th and the (n+2)th cycles, the shift register 201, as seen in FIG. 3, will have a content "0101". Each of the flip-flops 201a to 201d has a data input terminal D and a trigger terminal T for receiving shift pulses. The decoder 202 receives as inputs the contents of the shift register 201 and the buffer input pointer 302 and delivers a storing request nullifying instruction signal to the store data buffer control 30 at the time of instruction re-execution after the occurrence of a fault. The control 203 receives a signal indicating the occurrence of a fault from the processor 1 via a line 102 at the time of the fault occurring and performs a control necessary for the re-execution of instructions, that is, delivers a reset signal to a signal line 204 and a storing request re-starting instruction signal to a signal line 205.

The flip-flops 301 of the store data buffer control 30 serve to represent whether or not the store data buffers store data therein. The flip-flops 301-1 to 301-4 correspond respectively to the store data buffers 4-1 to 4-4 in FIG. 1. Each of the buffer input and output pointers 302 and 303 is a 2-bit binary counter and the former names the store data buffer in which an input storing data is to be stored while the latter specifies the store data buffer from which the content, i.e. the stored storing data, is to be read. The decoders 304 and 305 respectively decode the contents of the buffer input and output pointers 302 and 303 and select one of the flip-flops 301-1 to 301-4 for representing the store data. The selection circuit 306 consists of OR gates and receives the outputs of the decoders 202 and 305. The OR gate 307 makes the logical sum of the outputs of the store data representing flip-flops 301-1 to 301-4. The control 308 serves to control the input and the output of the storing data and delivers a storing request signal to a signal line 309.

When the store data buffer control 30 receives a storing request signal from the instruction control 10 through the signal line 100, the input storing data is stored, under the controlling operation of the control 308, in the store data buffer specified by the buffer input pointer 302. The content of the buffer input pointer 302 is decoded by the decoder 304 energized by the storing request so that that flip-flop of the store data representing flip-flops 301-1 to 301-4 which corresponds to the store data buffer that stores the above mentioned input data, is set. Then, the buffer input pointer 302 is incremented in response to a signal obtained by delaying the storing request signal through a delay line $D_1$ so as to indicate the store data buffer which is to store the next input storing data. The delay line $D_1$ serves to delay a store buffer number signal by at least a time equal to the storing request pulse width. The control 308, by detecting through the OR gate 307 that one of the flip-flops 301-1 to 301-4 is in the set state, delivers a new storing request to the memory control 5 through a signal line 309 and simultaneously reads out the content of the store data buffer specified by the buffer output pointer 303 to transfer the content to the memory control 5. When the reading of data from the store data buffer is finished, the content of the buffer output pointer 303, which was received from the control 309 by the pointer 303 after having been delayed through a delay line $D_2$, is decoded by the decoder 305 energized by the signal from the control 308 so that that flip-flop of the store data representing flip-flops 301-1 to 301-4 which corresponds to the store data buffer whose content was read out, is reset. Then, the buffer output pointer 303 is incremented in response to a signal obtained through the delay line $D_2$. Incidentally, it should here be noted that the flip-flops 301-1 to 301-4 and the buffer input and output pointers 302 and 303 are initially reset before the start of operation by the control 308.

The storing request signal generated by the instruction control 10 is also received by the shift register 201 of the re-execution control 20 through the signal line 100. The storing request signal received by the shift register 201 is sequentially shifted rightward from bit position 201a toward bit position 201d in response to shift pulses sent through the line 101 from the processor 1 and vanishes every four shift cycles. Namely, the content of the shift register 201 represents the successive storing requests delivered in the four previous sequential cycles. At the time of instruction re-execution after the occurrence of a fault, the control 203 delivers a reset instruction signal to a signal line 204 and a storing request restarting instruction signal to a signal line 205. When the decoder 202 receives the reset instruction signal, it generates a storing request nullifying instruction signal to nullify the content of the store data buffer corresponding to the storing request remaining then in the shift register 201. For example, if two storing requests remain in the shift register 201 and if the content of the buffer input pointer 302 represents a value "3", then the store data buffers 4-1 and 4-2 are selected in the instruction re-execution. The decoder 202 receives as inputs the contents of the shift register 201 and the buffer input pointer 302 and generates a storing request nullifying instruction signal to nullify the contents of the store data buffers specified in the instruction re-execution. The storing request nullifying instruction signal generated by the decoder 202 is used through the selection circuit 306 to reset the store data representing flip-flops 301-1 to 301-4. As a result of resetting the flip-flops, the contents of the corresponding store data buffers are nullified so that the storing requests are re-executed under the control operation of the re-execution control 20 at the time of instruction re-execution. The control 308 of the store data buffer control 30 receives a storing request re-starting instruction signal from the re-execution control 20 through the signal line 205 and if there then remains a store data representing flip-flop which is still in the set state without having been reset in the previous processing of nullifying the contents of the store data buffers, the control 308 delivers a new storing request signal to a signal line 309 so as to re-execute only storing operations.

As described above, according to this invention, the reliability of the information processor using a store data buffer control system can be improved since the data not executable in the operation of instruction re-execution is prevented from being left in the store data buffers when a fault occurs and also since the fault data is prevented from being directly taken in the memory.

What we claim is:

1. A store data buffer control for a system in which data to be stored from a processor to a memory is temporarily and sequentially stored in a plurality of store data buffers and the stored data is then stored sequentially in said memory from said store data buffers, comprising:
- indication means provided for each of said store data buffers to indicate the presence or absence of data for each store data buffer;
- first designation means responsive to a store request signal from said processor for designating sequentially that one of said store data buffers into which data from the processor is to be next stored, said first designation means including means for causing the indication means corresponding to the designated store data buffer to indicate the presence of data;
- second designation means for designating sequentially one of said store data buffers from which data is to be transferred into said memory;
- first control means responsive to an indication of the presence of data by at least one of said indication means for instructing data transfer from the store data buffer designated by said second designation means to the memory, and simultaneously for causing the indication means corresponding to the store data buffer designated by the second designation means to indicate the absence of data for that store data buffer;
- store request hold means for storing successive request signals from said processor and for holding the store request signals for a predetermined period of time; and
- indication changing means connected to said first designation means and said store request hold means and responsive to occurrence of a fault in the processor which may result in the storing of invalid data in at least one of said store data buffers in response to the indication of the presence of data by at least one of said indication means for causing said indication means to indicate the absence of data for those store data buffers which have received data on the basis of the request signals held in said store request hold means, whereby said first control means will not recognize the presence of data in those store data buffers and therefore will not instruct a data transfer of any data stored therein, thereby to prevent the transfer of invalid data to said memory.

2. A data buffer control system as claimed in claim 1 wherein said store request hold means comprises a shift register shifted by a cycle signal delivered from said processor, said shift register having a number of stages which equals the number of cycles covering said predetermined period of time.

3. A store data buffer control system as claimed in claim 2 wherein said indication changing means includes means responsive to a signal representative of the occurrence of a fault for causing the indicating means corresponding to data-loaded ones of said store data buffers which are demanded by the store request signals held in said shift register to indicate the absence of data.

4. A store data buffer control system as claimed in claim 3 wherein said indication means comprises a plurality of flip-flops each provided for a respective store data buffer for indicating the status of data in said store data buffers.

5. A store data buffer control system as claimed in claim 4 wherein said first and second designation means are provided as respective counters.

6. A fault-tolerant buffer control system for store data buffers provided between a data processor and a memory for temporarily and sequentially storing data passing from said data processor to said memory in response to request signals from said processor, comprising:
- data buffer control means including a plurality of flip-flops each provided for a respective store data buffer for indicating the full-empty status of said store data buffers in response to said store requests from said processor and for effecting data transfer to said memory from those store data buffers which is indicated by one of said flip-flops to have data stored therein;
- shift register means for sequentially storing store requests generated from the processor during successive periods each corresponding to a predetermined number of cycles of processor operation; and
- decoder means responsive to the occurrence of a fault in the processor which may result in the storing of invalid data in at least one of said store data buffers for providing a reset signal to those ones of said flip-flops corresponding to the store data buffers loaded with data at that time and demanded by the store requests held in said shift register means to reset said ones of flip-flops to thereby invalidate the indication of data in the demanded store data buffers, whereby the transfer of invalid data to said memory by said data buffer control means is prevented.

7. The buffer control system according to claim 6 wherein said predetermined number of cycles is equal to the re-executable cycles of the processor.

* * * * *